Re. 24905
Jan. 7, 1958      J. L. GIFFEN      2,818,949
BRAKE-CLUTCH CONSTRUCTION
Filed July 8, 1954
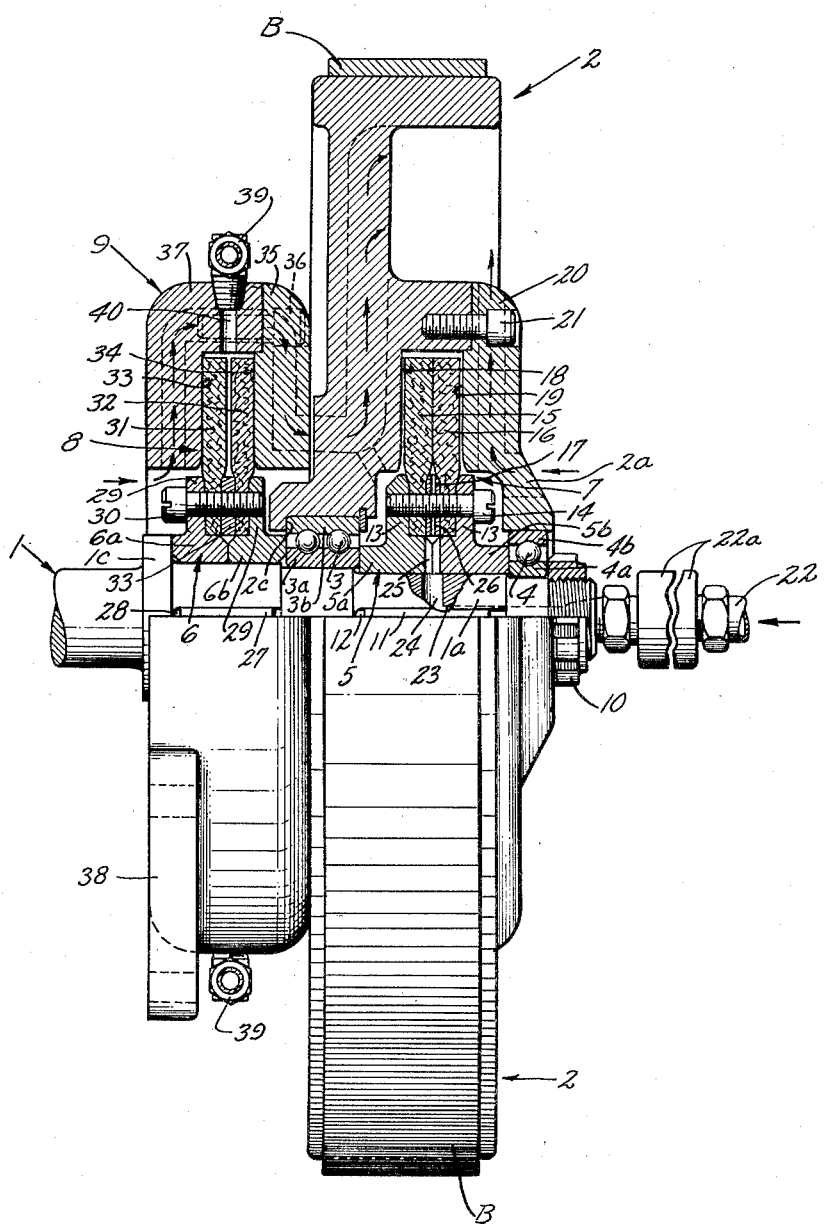
INVENTOR
JAMES L. GIFFEN
BY Bates & Willard
ATTORNEYS United States Patent Office 2,818,949
Patented Jan. 7, 1958

2,818,949

BRAKE-CLUTCH CONSTRUCTION

James L. Giffen, Hudson, N. Y., assignor to Emhart Manufacturing Company, Hartford, Conn., a corporation of Delaware Application July 8, 1954, Serial No. 442,171

11 Claims. (Cl. 192—18)

This invention relates to improvements in high speed clutches and brakes and more particularly to improvements in high speed brake and clutch combinations. While not restricted thereto, the clutches and brakes to which the invention is applicable are those which are particularly adapted for use in punch presses and the like, in which the press shaft is selectively coupled to a rapidly rotating power source and to a brake.

Shortcomings of the prior art brakes and brake-clutch combinations include lost motion and backlash between the press shaft and the driven flywheel which causes the press to operate with a "snap over" or rebound at the bottom of its stroke on heavy bottoming jobs, against heavy pressure pads in the press tools or against air or spring cushions. There is the further shortcoming that the press slide, carrying a punch or other tool, may "drop" or run ahead of its drive on the downstroke, particularly in the operation of a press in which the slide has a long stroke and the punch or other tool is large and heavy.

The shortcomings of the prior art brakes and brake-clutch assemblies are obviated by the present invention which has for an object the provision of a brake and a brake-clutch construction having no sliding dogs, keys, splines, gears, or other sliding parts, and requiring no springs or other lost motion and backlash take-up devices.

A further object is the provision of a brake-clutch unit which is extremely simple to construct and operate and can be manufactured at low cost.

Other objects and advantages will be apparent from the following description of an embodiment of the invention illustrated in the accompanying drawing, which is an elevation view, half of which is in cross section, showing the improved brake-clutch assembly of the invention operatively associated with a press shaft and a press fly wheel, only a portion of the shaft being shown, and wherein the view shows the shaft clutched to the brake and disengaged or unclutched from the drive of the fly wheel.

Referring to the drawing, there is shown a press shaft, generally designated 1, which has an end portion 1a on which is mounted the hub 2a of a flywheel, generally designated 2. The shaft 1 is supported by means (not shown) for rotation about its axis. As shown in the drawing, suitable bearings, such as ball bearing assemblies 3 and 4, are provided in the flywheel hub 2a around the portion 1a of the press shaft 1. Inner race 3a of the bearing 3 is secured on the shaft 1 between hubs 5 and 6 of clutch plate assemblies, generally designated 7 and 8, which respectively are associated with and releasably couple the shaft 1 to the flywheel 2 and to a brake assembly generally designated 9. An internal annular shoulder portion 2c of the flywheel hub 2a properly positions the outer race 3b. The inner races 3a and 4a of the bearings 3 and 4 on the shaft portion 1a engage the opposite ends of the flywheel clutch hub 5 within the flywheel hub 2a. A flywheel cap nut 10 on the shaft 1 secures the clutch hub 5 on portion 1a of the shaft 1 between the inner races 3a and 4a of the bearings 3 and 4 and presses the bearing race 3a against the hub 6 of the brake clutch 8, and the hub 6 against a shoulder portion 1c of the shaft 1.

As thus secured, the flywheel 2, which may be driven by a belt B, or other suitable driving means, turns freely on the ball bearings 3 and 4 about the shaft 1 when the flywheel 2 is not engaged by the clutch 7.

Referring more particularly to the clutch 7, the hub 5 of the clutch comprises two identical flanged rings 5a, 5b which are secured against rotation on the shaft section 1a by a key 11 and a keyway 12 in the shaft. Flanges 13, 13 of the rings 5a, 5b are secured by bolts 14, or other suitable fasteners, in face-to-face relation and tightly hold therebetween a pair of identical concentric flexible friction clutch plates 15 and 16 which are spaced slightly apart by an annular plate 17.

In the embodiment illustrated, each of the friction plates 15 and 16 is formed of heavy cowhide. However, it should be understood that other flexible friction plate materials may be employed and a greater or lesser thickness may be used as strength and flexibility may require.

Air is introduced under pressure between the plates 15 and 16 to spread the plates into clutching engagement with adjacent annular walls 18 and 19, respectively, of the flywheel 2. As shown in the drawing, the wall 19 is provided on a disc or plate portion 20 of the flywheel 2 which is secured by bolts 21 to the main body portion of the flywheel on which the clutch face wall 18 is formed.

The air under pressure introduced between the clutch plates 15 and 16 is supplied by a supply line 22 which may be provided in well known manner with manual or automatic valve controls (not shown) for selectively timing the application of the pressure and thereby the clutching of the shaft 1 to the normally continually rotating flywheel 2.

The air pressure in the line 22 is introduced through a roto-coupling 22a into an axial bore 23 in the shaft 1 from which the pressure is directed by radial bores 24 into an annular chamber 25 between the hubs 5a and 5b. From the chamber 25 the air under pressure is discharged through radial bores 26, which are in the spacer plate 17, into the space between the clutch plates 15 and 16 where the resulting increase in pressure forces the flexible plates 15 and 16 from the disengaged positions shown in the drawing into firm surface engagement with the flywheel walls 18 and 19, respectively, and thereby firmly clutches the shaft 1 to the rotating flywheel 2 for rotation therewith.

Clutch disengagement is effected merely by relieving the pressure in the line 22 whereupon the pressure between the plates 15 and 16 is relieved and the flywheel 2 rotated on the bearings 3 and 4 free of clutching engagement with the clutch plates 15 and 16.

In accordance with the present invention, the clutch 8 for the brake 9 is similar in construction and operation to the flywheel drive clutch 7. More particularly, the brake clutch 8 includes the hub 6 which comprises two identical flanged rings 6a, 6b which are secured against rotation on the shaft 1 by a key 27 and keyway 28 in the shaft. Flanges 29, 29 of the rings 6a, 6b are secured by bolts 30, or other suitable fasteners, in face-to-face relation and tightly hold therebetween a pair of identical concentric flexible friction clutch plates 31 and 32 which are spaced slightly apart by an annular plate 33.

In the illustrated embodiment, each of the friction plates 31 and 32 is formed of the same heavy cowhide as the plates 15 and 16. However, other flexible friction plate materials may be employed and a greater or lesser thickness may be used as strength and flexibility may require.

Air is introduced under pressure between the plates 31 and 32 to spread the plates into clutching engagement with adjacent annular walls 33 and 34 of the brake 9 within which the clutch plates 31 and 32 are rotatably located. As shown in the drawing, the wall 34 is provided by a disc or plate portion 35 of the brake housing which is secured by bolts 36 to the main body portion 37 of the brake housing on which the clutch face wall 33 is formed and which is stationarily secured as by means of a fixed anchoring bracket 38.

Air under pressure is introduced between the clutch plates 31 and 32 through fittings 39, 39 and passages 40 in the brake housing 37. The air pressure thus introduced into the brake housing through the fittings 39 and passages 40 forces the flexible plates 31 and 32 from disengaged positions (not shown) into firm surface engagement with the brake walls 33 and 34 as shown in the drawing, and thereby firmly brakes the shaft 1 against rotation.

Brake release is effected merely by relieving the pressure to the fittings 39 whereupon the pressure between the plates 31 and 32 is relieved and the shaft 1 is free to rotate. Preferably, the air pressure is automatically directed to the brake fittings 39 when the pressure is relieved to the clutch coupling 22a and is directed to the latter at the same time pressure is relieved in the fittings 39. Thus the brake 9 or the flywheel 2 (but never both) are always clutched to the shaft 1.

As shown in the drawing, the brake housing 35, 37 and the flywheel 2 and flywheel plate 20 may be provided in well-known manner with suitable passages through which flow of cooling air (indicated by arrows) may be impelled by rotation of the flywheel 2 to cool the brake 9 and brake clutch 8 together with the flywheel 2 and clutch 8.

While preferred embodiments of the invention normally will be provided with two clutch plates for both the drive and the brake, it will be appreciated that a single flexible clutch plate may be provided for either and pressure provided between the flywheel and one face of the flywheel clutch plate or between the brake housing and the brake clutch to force the other face of the clutch or clutches into clutching engagement with an adjacent flywheel or brake wall.

While the invention has been described as applied operatively to a construction which includes a driven member in the form of a press shaft 1, a driving member in the form of a flywheel 2, and a brake 9, the invention obviously is susceptible of use in other structures to make and break connection between a rotary driving member and a rotary member which is to be driven, and between a stationary member and a rotating member to releasably brake and hold the latter.

Other changes in and modifications of the illustrative embodiments of the invention will be obvious to those skilled in the art and, therefore, the invention is not to be limited to the details of the embodiment shown in the drawings and hereinbefore particularly described.

I claim:

1. A drive and brake mechanism comprising a rotary member to be driven and to be braked, a brake member, a rotary driving member, two clutch units, each unit having a portion fastened to one of said members, each said clutch unit having a flexible clutch plate secured to said fastened portion of the unit, means for applying pressure on one side of said plate of one of said clutch units to force into clutching surface engagement with a wall of one of said members the portion of said plate remote from the secured portion of said plate to couple the rotary members, and means for increasing the pressure on one side of said plate of the other of said clutch units to force into clutching surface engagement with a wall of one of said members the portion of said plate remote from the secured portion of said plate to couple one of the rotary members to the brake member, and wherein the space between the said portion of each clutch plate and the wall with which said portion is clutchingly engageable normally freely communicates with space on the opposite side of the plate and wherein said communication is broken only when said portion of the clutch plate is pressed into clutching engagement with said wall.

2. The drive and brake mechanism recited in claim 1 and wherein said clutch portions are fastened to the same one of said members.

3. The drive and brake mechanism recited in claim 1 and wherein the clutching surface portions of said plates extend radially outward from the secured portions of the plate.

4. The drive and brake mechanism recited in claim 1 and wherein clutching pressure is always applied and only to one of said clutch units at a time.

5. A drive and brake mechanism comprising the combination with a rotary member to be driven and to be braked, a brake member, and a rotary driving member, two clutch units, each unit having a portion fastened to one of said members for rotation therewith, each said clutch unit having a pair of spaced circular flexible clutch plates secured to said fastened portion of the unit, means for introducing air under pressure between each pair of said plates to force into clutching surface engagement with spaced walls of another of said members the portion of said plates remote from the secured portions of said plates, one of said units effecting clutching engagement of the rotary members and the other of said units effecting clutching engagement of one of the rotary members and the brake member, and wherein the space between said walls and said plates normally communicates freely with the space between said plates, and wherein the clutching engagement of said plates with said walls shuts off said communication.

6. The drive and brake mechanism recited in claim 5 and wherein said spaced walls are provided with a substantially air tight connection so that air pressure between said plates of each unit is maintained when the plates are forced by said pressure into clutching engagement with said walls.

7. The drive and brake mechanism recited in claim 5 and wherein said clutch plates are secured to the member to be driven and the others of said members are a continually rotating flywheel and the brake member.

8. The drive and brake mechanism recited in claim 7 and wherein air under pressure is introduced through a roto-coupling axially into said member to be driven and discharged radially from said member between said plates of one clutch unit and between the plates of the other of said clutch units through the brake member.

9. A brake mechanism comprising in combination a driven rotary member, a stationary brake member, a clutch unit including a portion fastened to one of said members, said clutch unit having a circular flexible clutch plate a portion of which is secured to said fastened portion of the clutch unit, and means for applying air under pressure against said plate to force into clutching surface engagement with a wall of the other of said members a portion of said plate remote from the secured portion thereof, and wherein space on the side of the plate against which air pressure is applied and space on the side of the plate which is engageable with said wall normally are in free communication, and wherein said communication is interrupted only when said plate is forced by said air under pressure into clutching engagement with said wall.

10. A brake mechanism comprising in combination a driven rotary member, a stationary brake member, a clutch unit including a portion fastened to said rotary member for rotation therewith, said clutch unit having a circular flexible clutch plate a portion of which is secured to said fastened portion of the clutch unit, and means for applying against said plate air pressure introduced through the stationary member to force into clutching surface engagement with a wall of the stationary member a portion of said plate remote from the secured portion thereof, and wherein space on the side of the plate against which air pressure is applied and space on the side of the plate which is engageable with said wall normally are in free communication, and wherein said communication is interrupted only when said plate is forced by said air under pressure into clutching engagement with said wall.

11. A brake mechanism comprising in combination a driven rotary member, a stationary brake member, a clutch unit including a portion fastened to said rotary member for rotation therewith, said clutch unit having a pair of spaced circular flexible clutch plates, portions of which are secured to said fastened portion of the clutch unit, and means for introducing air under pressure between said plates through the stationary member to force into clutching surface engagement with spaced walls of the stationary member portions of said plates remote from the secured portions thereof, and wherein the space between said walls and said plates normally communicates freely with the space between said plates, and wherein the clutching engagement of said plates with said walls shuts off said communication.

References Cited in the file of this patent

UNITED STATES PATENTS

| | | |
|---|---|---|
| 731,464 | Kasson | June 23, 1903 |
| 847,834 | Sears et al. | Mar. 17, 1907 |
| 2,619,212 | Cardwell et al. | Nov. 25, 1952 |